(12) United States Patent
Thor

(10) Patent No.: US 11,807,083 B2
(45) Date of Patent: Nov. 7, 2023

(54) HORIZONTAL REINFORCEMENT FOR A MOTOR VEHICLE DOOR

(71) Applicant: PSA AUTOMOBILES SA, Poissy (FR)

(72) Inventor: Tou Thor, Pont de Roide Vermondans (FR)

(73) Assignee: PSA AUTOMOBILES SA, Poissy (FR)

( * ) Notice: Subject to any disclaimer, the term of this patent is extended or adjusted under 35 U.S.C. 154(b) by 87 days.

(21) Appl. No.: 17/616,965

(22) PCT Filed: Jun. 15, 2020

(86) PCT No.: PCT/FR2020/051020
§ 371 (c)(1),
(2) Date: Dec. 6, 2021

(87) PCT Pub. No.: WO2020/254748
PCT Pub. Date: Dec. 24, 2020

(65) Prior Publication Data
US 2022/0324306 A1 Oct. 13, 2022

(30) Foreign Application Priority Data
Jun. 20, 2019 (FR) .................. 1906674

(51) Int. Cl.
*B60J 5/04* (2006.01)

(52) U.S. Cl.
CPC ............ *B60J 5/0447* (2013.01); *B60J 5/0426* (2013.01); *B60J 5/0433* (2013.01)

(58) Field of Classification Search
CPC ...... B60J 5/0447; B60J 5/0426; B60J 5/0433; B60J 5/0429; B60J 5/0434; B60J 5/0458;
(Continued)

(56) References Cited

U.S. PATENT DOCUMENTS 2,141,659 A * 12/1938 Nehls ............... E05B 85/14
292/DIG. 31
4,702,040 A * 10/1987 Hellriegel .......... B60J 5/0412
49/502
(Continued)

FOREIGN PATENT DOCUMENTS

CN 103802642 B * 5/2016 ............ B60J 5/0404
DE 102013018236 A1 5/2014
(Continued)

OTHER PUBLICATIONS

International Search Report for PCT/FR2020/051020 dated Sep. 18, 2020.
Written Opinion for PCT/FR2020/051020 dated Sep. 18, 2020.

*Primary Examiner* — Amy R Weisberg
*Assistant Examiner* — Veronica M Shull
(74) *Attorney, Agent, or Firm* — Sandberg Phoenix & von Gontard PC

(57) ABSTRACT

The invention relates to a door (3) of a motor vehicle (1), having an outer wall and a lining (7) forming a casing (9), said casing (9) comprising: a main side reinforcement (17) extending longitudinally between a front edge (9A) and a rear edge (9C) of said casing (9); an upper reinforcement (15) extending longitudinally along an upper edge (9B) of said casing (9); an exterior opening control support (11) of the door (3), which is fixed to the upper reinforcement (15); the casing (9) further comprising: an auxiliary side reinforcement (21) which extends above the main side reinforcement (17) longitudinally between the front edge (9A) and the rear edge (9C) of the casing (9) and is fixed to the control support for the exterior opening (11) of the door (3).

7 Claims, 1 Drawing Sheet

(58) Field of Classification Search
CPC ........ B60J 5/042; B60J 5/0422; B60J 5/0437; B60J 5/0443; B60J 5/0455; B60J 5/0456
USPC ..................................................... 296/146.6
See application file for complete search history.

(56) References Cited

U.S. PATENT DOCUMENTS

| | | | | |
|---|---|---|---|---|
| 5,417,470 | A * | 5/1995 | Holt | B60J 5/0416 |
| | | | | 296/187.12 |
| 8,162,360 | B2 * | 4/2012 | Takaya | E05B 79/04 |
| | | | | 292/336.3 |
| 8,414,038 | B2 * | 4/2013 | Bedekar | E05B 77/04 |
| | | | | 292/216 |
| 11,608,659 | B2 * | 3/2023 | Kovie | E05B 77/04 |
| 2004/0104593 | A1 * | 6/2004 | Nakagawa | B60J 5/0443 |
| | | | | 296/146.6 |
| 2019/0084387 | A1 * | 3/2019 | Smith | B60J 5/0469 |

FOREIGN PATENT DOCUMENTS

| | | | |
|---|---|---|---|
| EP | 1527923 | A2 | 5/2005 |
| EP | 3127731 | A1 | 2/2017 |
| JP | 2008190209 | A | 8/2008 |
| JP | 2008307972 | A | 12/2008 |
| WO | 2016113475 | | 7/2016 |

* cited by examiner

[Fig 1]
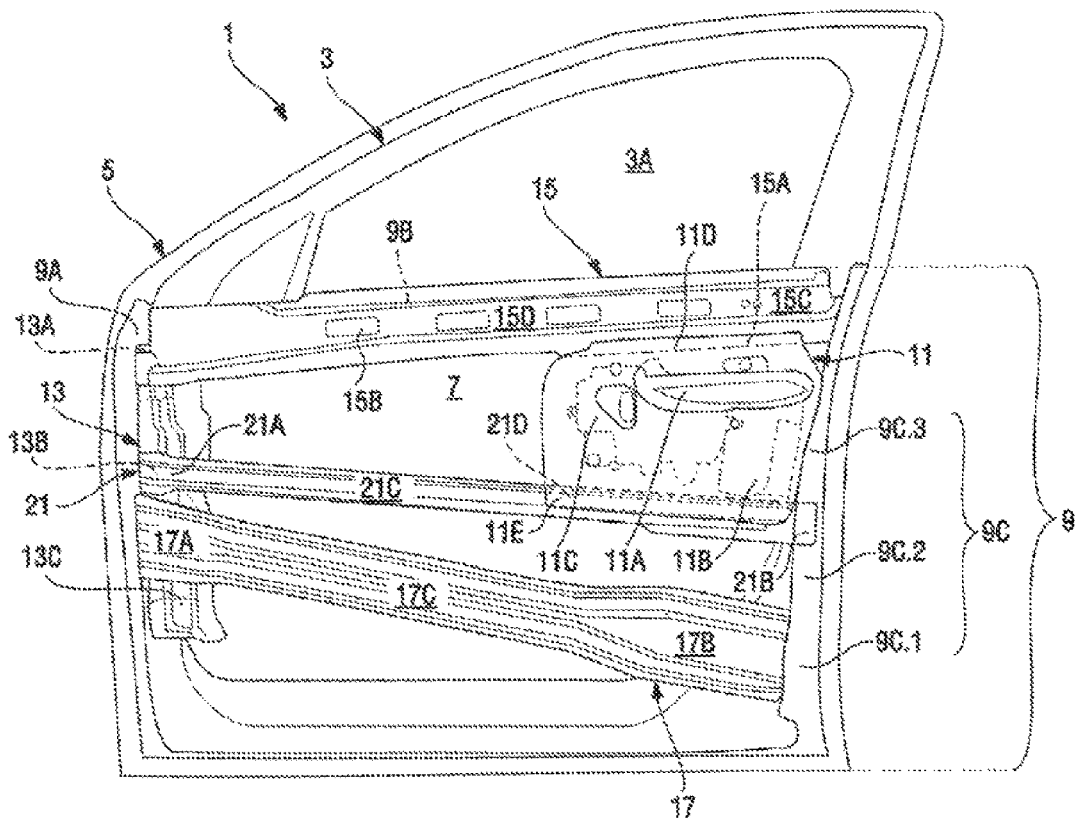
[Fig 2]
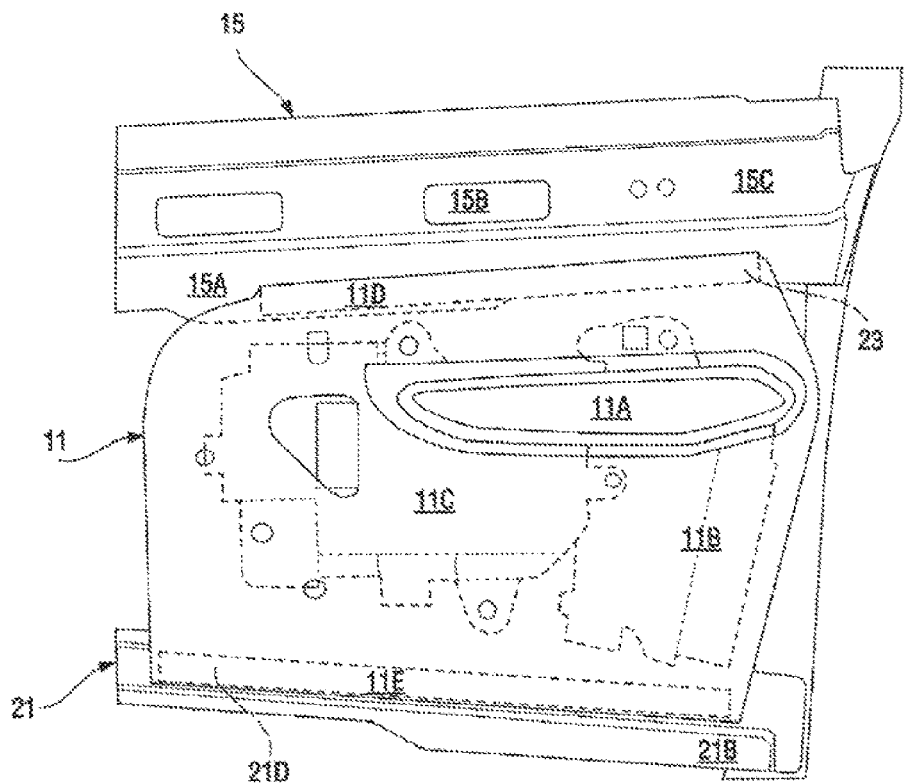

HORIZONTAL REINFORCEMENT FOR A MOTOR VEHICLE DOOR

CROSS-REFERENCE TO RELATED APPLICATIONS

This application is the U.S. National Stage under 35 USC § 371 of International Application No. PCT/FR2020/05120, filed Jun. 15, 2020 which claims the priority of French application 1906674 filed on Jun. 20, 2019, the content of which (text, drawings and claims) of both being incorporated here by reference.

BACKGROUND

The invention relates to the field of motor vehicles, and more particularly to the structure of a motor vehicle door.

At present, there are numerous protocols, developed by independent organizations, that make it possible to assess the resistance of vehicles to various impacts, including side impacts. These protocols are undergone by vehicles before they are put into service, and determine the dangers incurred by passengers or pedestrians during these impacts. In particular, the resistance of a vehicle door during a side impact is studied.

A vehicle door generally comprises an outer wall and a lining forming a casing, with several reinforcements positioned in the casing. Usually, an upper reinforcement is positioned longitudinally along an upper edge of the casing. A main side reinforcement is also positioned at the bottom of the casing, between a front edge and a rear edge of said casing. There is also an exterior opening control support for the vehicle door which allows the door to be opened and closed. This control support is positioned at the rear of the casing, and is attached to the upper reinforcement.

In a side impact, the upper and main side reinforcements sag. This sagging therefore causes a deformation of the control support and, therefore, a displacement of the exterior opening control toward the lock. Contact of the exterior opening control with the lock can then cause the lock to deform and the door to open, endangering the passengers of the vehicle. This is particularly true for the retractable exterior opening controls, more commonly referred to using the expression "flush," which are bulkier.

PCT Pub. No. WO 2016/113475 A1 discloses a motor vehicle door comprising an outer wall and a lining forming a casing, with a door exterior opening control located at the rear of the casing. The casing also comprises an inclined reinforcement located at the front of the exterior opening control. This reinforcement comprises weakening areas at a distance from its middle in order to filter the deformation resulting from a side impact, with the aim of preserving the mounting area of the exterior opening control and the lock control cable, and therefore avoiding inadvertent opening of the door. These measures concentrate on preserving the passage of the lock control cable but fail to prevent harmful interference between the exterior opening control and the lock.

SUMMARY

The object of the invention is to overcome at least one of the drawbacks of the above-mentioned prior art. More particularly, the object of the invention is to prevent the opening of the door of a vehicle during a side impact.

To this end, a motor vehicle door is disclosed having an outer wall and a lining forming a casing, said casing comprising: a main side reinforcement extending longitudinally between a front edge and a rear edge of said casing; an upper reinforcement extending longitudinally along an upper edge of said casing; a control support for the exterior opening of the door, which is fixed to the upper reinforcement; remarkable in that the casing further comprises: an auxiliary side reinforcement which extends above the main side reinforcement, longitudinally between the front edge and the rear edge of the casing, and is fixed to the control support for the exterior opening of the door.

According to an advantageous embodiment, the auxiliary side reinforcement comprises a rear end fixed to a central portion of the rear edge of the casing, said central portion being adjacent to an upper portion of said rear edge with an area for fixing a lock of the door.

According to an advantageous embodiment, the exterior opening control support is adjacent to the lock fixing area of the door.

According to an advantageous embodiment, the exterior opening control support is a plate with an upper edge fixed to the upper reinforcement and a lower edge fixed to the auxiliary side reinforcement.

According to an advantageous embodiment, the attachment of the upper edge and of the lower edge of the exterior opening control support to the upper reinforcement and to the auxiliary side reinforcement, respectively, is distributed over more than 80% of the length of each of said edges.

According to an advantageous embodiment, the casing is devoid of a vertical reinforcement between the median portions of the main side reinforcement and of the upper reinforcement.

According to an advantageous embodiment, each of the main side reinforcement, the upper reinforcement, and the auxiliary side reinforcement forms a beam with a quadratic bending moment, the quadratic bending moment of the auxiliary side reinforcement being less than the quadratic bending moment of the main side reinforcement.

According to an advantageous embodiment, the quadratic bending moment of the auxiliary side reinforcement is 50% less than the quadratic bending moment of the main side reinforcement.

According to an advantageous embodiment, the door comprises the exterior opening control fixed to the exterior opening control support, said exterior opening control being of the retractable type.

Additionally, a motor vehicle is disclosed comprising at least one door as described above.

The construction of the vehicle door is advantageous in that they make it possible to limit the deformation of the exterior opening control support during a side impact. Thus, the opening of the vehicle door during such an impact is avoided. Indeed, the deformation of the exterior opening control support causes a displacement of the exterior opening control toward the lock, which may cause the door to open due to interference with the lock. The addition of an auxiliary side reinforcement, positioned longitudinally in the door, allows a better distribution of the forces exerted on the door during the side impact, since this reinforcement will receive part of the stresses exerted on the door. In addition, the control support has additional support on this auxiliary side reinforcement, thus allowing better control of the bending behavior of the support. Thus, interference with the lock is reduced, thus preventing the door from opening upon impact. Finally, the manufacture of this reinforcement is carried out in materials and using techniques known to those skilled in the art; it is inexpensive. It is also easy to install in the door.

Other features and advantages of the present invention will be better understood with the aid of the description and the drawings.

BRIEF DESCRIPTION OF THE DRAWINGS

FIG. 1 is a view of the structure of a motor vehicle door, without the outer wall;

FIG. 2 is a view of the attachment area between an exterior opening control support for a door and the auxiliary upper and side reinforcements, as shown in FIG. 1.

DETAILED DESCRIPTION

FIGS. 1 and 2 show two views of a reinforced motor vehicle door.

The motor vehicle 1 (partially shown in FIG. 1) comprises the door 3 mounted on a door frame 5. The door 3 comprises an outer wall (not shown in these figures for reasons of clarity of presentation of the invention) and a lining 7 inside the vehicle 1, the outer wall and the lining 7 being attached together. The door 3 also comprises an upper part with a window 3A, and a lower part. In the lower part of the door 3, the outer wall and the lining 7 form a casing 9 (partially shown). This casing in particular comprises an exterior opening control support 11 of the door 3, which supports both an exterior opening control 11A, comprising a handle advantageously of the retractable type ("flush"), and a lock 11B capable of closing the door 3 by means of a closing mechanism 11C.

The casing 9 of the door 3 of the vehicle 1 further comprises several reinforcements.

A hinge reinforcement 13 extends along a front edge 9A of the casing 9. This hinge reinforcement 13 makes it possible to reinforce the area for securing the hinges of the door 3 to the door frame 5. This hinge reinforcement 13 comprises an upper end 13A, a middle portion 13B and a lower end 13C.

The door 3 further comprises an upper reinforcement 15 that extends along the window 3A of the door 3. This reinforcement 15 extends longitudinally along an upper edge 9B of the casing 9, and is fixed at the front on the front edge 9A of the casing 9 and on the upper end 13A of the hinge reinforcement 13. The upper reinforcement 15 is also fixed at the rear on a rear edge 9C of the casing 9. This reinforcement 15 comprises a lower edge 15A on which is secured, from a rear end 15C to a middle portion 15D of said reinforcement 15, an upper edge 11D of the exterior opening control support 11. This reinforcement 15 advantageously has a U-shaped cross-section and median orifices 15B capable of facilitating the absorption of shocks by the reinforcement 15.

A main side reinforcement 17 is also found in the casing 9 of the door 3. This reinforcement 17 extends longitudinally between the front edge 9A and the rear edge 9C of the casing 9, where it is attached. The main side reinforcement 17 comprises a front end 17A and a rear end 17B, which are attached, respectively, to the lower end 13C of the hinge reinforcement 13 and to a lower portion 9C.1 of the rear edge 9C of the casing 9. Advantageously, each end (17A, 17B) of the reinforcement 17 has a width that is 30% to 40% greater than the width of a middle portion 17C of said reinforcement 17.

Finally, the casing 9 comprises an auxiliary side reinforcement 21 that extends longitudinally above the main side reinforcement 17, between the front 9A and rear 9C edges of the casing 9. The auxiliary side reinforcement 21 comprises a front end 21A secured to the middle portion 13B of the hinge reinforcement 13, and a rear end 21B secured to a central portion 9C.2 of the rear edge 9C of the casing 9. This auxiliary side reinforcement 21 further comprises a U-shaped cross-section. The front 21A and rear 21B ends of the reinforcement 21 have a width greater than the width of a middle portion 21C of said reinforcement 21. Advantageously, the width of each of the ends (21A, 21B) of the reinforcement 21 is 30% to 40% greater than the width of the middle portion 21C.

The exterior opening control support 11 of the door 3 comprises a lower edge 11E fixed to an upper edge 21D of the auxiliary side reinforcement 21. Advantageously, the exterior opening control support 11 is a plate, the attachment of the upper 11D and lower 11E edges of which to the upper reinforcement 15 and to the auxiliary side reinforcement 21, respectively, is distributed over more than 80% of the length of each of said edges (11D, 11E). The attachment of the opening control support 11 to the upper reinforcement 1 and auxiliary side reinforcement 21 is advantageously continuous, and is advantageously accomplished by gluing. Preferably, the control support 11 is adjacent to the area for mounting the lock 11B of the door 3. This mounting area of the lock 11B of the door 3 is positioned in an upper portion 9C.3 of the rear edge 9C of the casing 9 adjacent to the central portion 9C.2.

Generally speaking, each of the main side reinforcement 17, the upper reinforcement 15 and the auxiliary side reinforcement 21 forms a beam with a quadratic bending moment, the quadratic bending moment of the auxiliary side reinforcement 21 being less than the quadratic bending moment of the main side reinforcement 17. Advantageously, the quadratic bending moment of the auxiliary side reinforcement 21 is 50% less than the quadratic bending moment of the main side reinforcement 17.

The invention claimed is:

1. A motor vehicle door comprising an upper, window, part and a lower part, said lower part comprising an outer wall and a lining which, in combination, form a casing, said casing comprising a front edge, an upper edge, and a rear edge; said door further comprising:
   a main side reinforcement extending longitudinally between said front edge and said rear edge of said casing;
   an upper reinforcement extending longitudinally along an upper edge of said casing;
   an exterior opening control support of the door, an exterior opening control and a lock being mounted to said exterior opening control support, said exterior opening control support comprising a plate having an upper edge fixed to the upper reinforcement; and
   an auxiliary side reinforcement positioned between said main side reinforcement and said upper reinforcement, extending longitudinally between the front edge and the rear edge of the casing, said plate of said exterior opening control support having a lower edge fixed to the exterior opening control support of the door.

2. The motor vehicle door according to claim 1, wherein the auxiliary side reinforcement comprises a rear end fixed to a central portion of the rear edge of the casing, said central portion being adjacent to an upper portion of said rear edge with an area for attaching a lock of the door.

3. The motor vehicle door according to claim 2, wherein the exterior opening control support is adjacent to the lock attachment area of the door.

4. The motor vehicle door according to claim 1, wherein the attachment of the upper edge and of the lower edge of the exterior opening control support to the upper reinforcement and to the auxiliary side reinforcement, respectively, is distributed over more than 80% of the length of each of said edges.

5. The motor vehicle door according to claim 1, wherein the casing is devoid of a vertical reinforcement between the median portions of the main side reinforcement and of the upper reinforcement.

6. The motor vehicle door according to claim 1, wherein the door comprises said exterior opening control is of the retractable type.

7. A motor vehicle comprising at least one door, wherein said door is the door according to claim 1.

* * * * *